US011024015B2

(12) United States Patent
Hada

(10) Patent No.: US 11,024,015 B2
(45) Date of Patent: Jun. 1, 2021

(54) IMAGE PROCESSING APPARATUS AND DISTORTION CORRECTION COEFFICIENT CALCULATION METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Ryuji Hada, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/557,905

(22) Filed: Aug. 30, 2019

(65) Prior Publication Data
US 2020/0294208 A1 Sep. 17, 2020

(30) Foreign Application Priority Data
Mar. 14, 2019 (JP) .............................. JP2019-047448

(51) Int. Cl.
G06T 5/00 (2006.01)
H04N 5/232 (2006.01)
H04N 5/357 (2011.01)

(52) U.S. Cl.
CPC ......... *G06T 5/006* (2013.01); *H04N 5/23229* (2013.01)

(58) Field of Classification Search
CPC ........... H04N 9/04517; H04N 9/04519; H04N 9/646; H04N 5/357; H04N 5/3572; H04N 5/23229; G06T 5/006; G06T 5/001
See application file for complete search history.

(56) References Cited

U.S. PATENT DOCUMENTS

| 7,499,082 | B2 | 3/2009 | Iga |
| 8,675,115 | B1* | 3/2014 | Gigushinski ......... H04N 5/3572 348/335 |
| 8,724,923 | B2 | 5/2014 | Nakazono et al. |
| 2012/0169904 | A1* | 7/2012 | Hizume .................. H04N 9/07 348/242 |

(Continued)

FOREIGN PATENT DOCUMENTS

| EP | 2752814 A2 | 7/2014 |
| JP | 2007-079708 A | 3/2007 |

(Continued)

Primary Examiner — Albert H Cutler
(74) Attorney, Agent, or Firm — Kim & Stewart LLP

(57) ABSTRACT

An image processing apparatus includes an input buffer, a processor configured to convert a position of an input pixel of an input image received into the input buffer into a first pixel position of an output image using a first conversion function, convert a position of an output pixel in a vicinity of the first pixel position of the output image into a second pixel position of the input image using a second conversion function, calculate a pixel value of the second pixel position by interpolation using pixels of the input image that are in a vicinity of the second pixel position of the input image, and output the position of the output pixel as a corrected position of the input pixel and the calculated pixel value as a pixel value at the corrected position.

12 Claims, 9 Drawing Sheets

(56) References Cited

U.S. PATENT DOCUMENTS

| | | | |
|---|---|---|---|
| 2013/0242186 A1* | 9/2013 | Zhu | H04N 19/146 348/441 |
| 2016/0260197 A1 | 9/2016 | Hada et al. | |
| 2016/0260202 A1* | 9/2016 | Saigo | H04N 5/2628 |
| 2018/0220117 A1 | 8/2018 | Hada et al. | |
| 2019/0289231 A1 | 9/2019 | Hada | |
| 2020/0092467 A1 | 3/2020 | Hada et al. | |

FOREIGN PATENT DOCUMENTS

| | | |
|---|---|---|
| JP | 2014-142917 A | 8/2014 |
| JP | 2017-016511 A | 1/2017 |

* cited by examiner

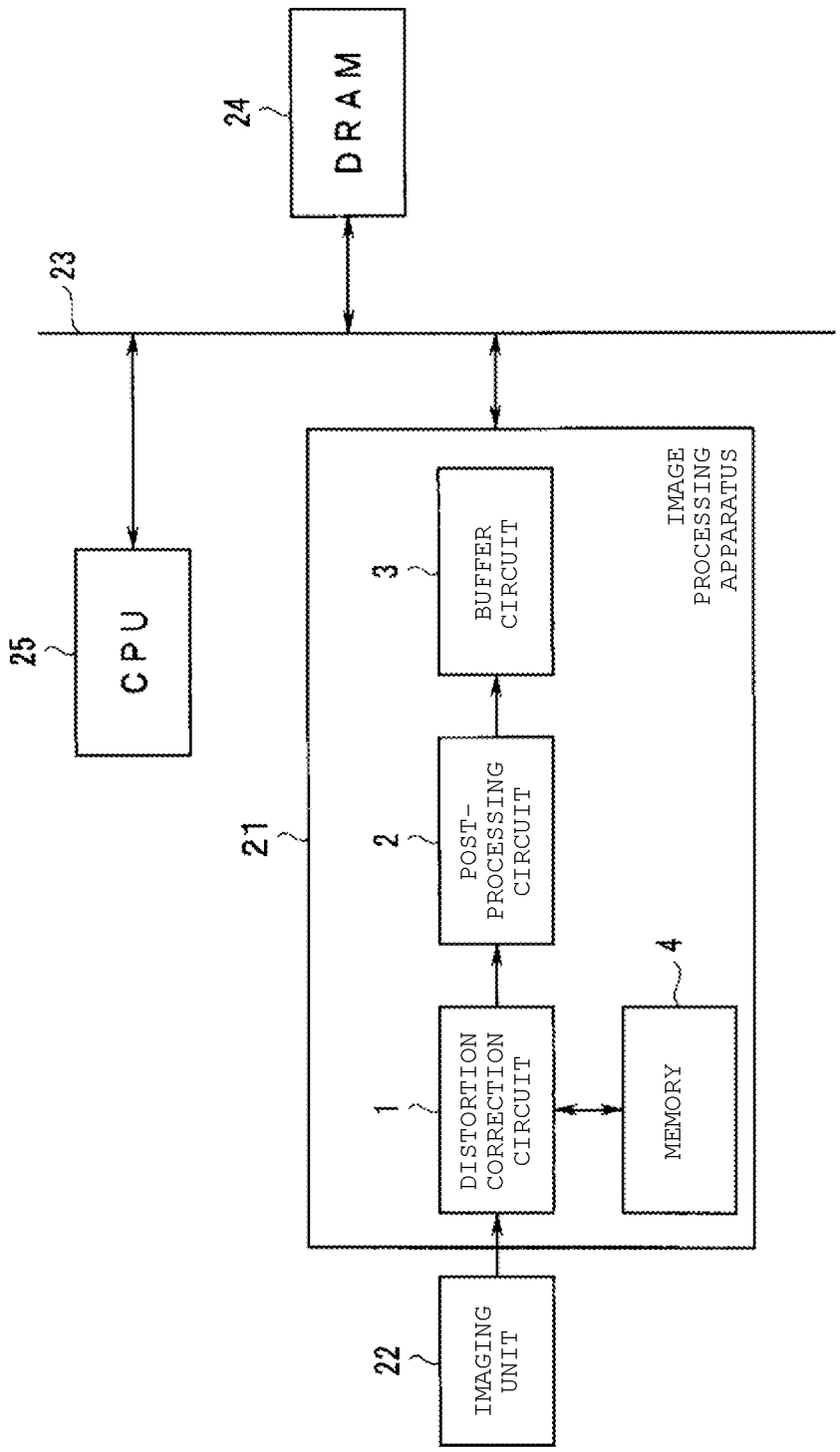

| DISTORTED POSITION | IDEAL POSITION |
|---|---|
| 200 | ... |
| 400 | ... |
| 600 | ... |
| 800 | ... |
| 1000 | 1400 |
| 1200 | 1500 |
| 1400 | ... |
| ... | ... |

FIG. 9B

| DISTORTED POSITION | IDEAL POSITION |
|---|---|
| 200 | ... |
| 400 | ... |
| 600 | ... |
| 800 | ... |
| 1000 | 1400 |
| 1101.45 ← INTERPOLATION | 1451.15 |
| ~~1200~~ (DELETE) | ~~1500~~ |
| ... | ... |

FIG. 9C

| DISTORTED POSITION | IDEAL POSITION |
|---|---|
| 200 | ... |
| 400 | ... |
| 600 | ... |
| 800 | ... |
| 915.12 ← INTERPOLATION | 1234.56 |
| ~~1000~~ (DELETE) | ~~1400~~ |
| ~~1101.45~~ | ~~1451.15~~ |

IMAGE PROCESSING APPARATUS AND DISTORTION CORRECTION COEFFICIENT CALCULATION METHOD

CROSS-REFERENCE TO RELATED APPLICATION

This application is based upon and claims the benefit of priority from Japanese Patent Application No. 2019-047448, filed Mar. 14, 2019, the entire contents of which are incorporated herein by reference.

FIELD

Embodiments described herein relate generally to an image processing apparatus and a distortion correction coefficient calculation method.

BACKGROUND

Generally, an image obtained by capturing an object by an imaging device such as a digital camera is influenced by distortion aberration or chromatic aberration of magnification in an optical system such as an imaging lens. To address this problem, an image processing apparatus can be used that electrically corrects image distortion from the optical system.

An image processing apparatus has been proposed that calculates an output pixel position by electrically correcting input pixels in order of raster scan. The image processing apparatus calculates an ideal pixel position of the output image without distortion based on a distorted pixel position, using a conversion function. The image processing apparatus calculates the distorted pixel position based on the calculated ideal position, using an inverse function of the conversion function. In this case, an error between the conversion function for calculating the ideal pixel position and the inverse function for calculating the distorted pixel position can become large. This causes a problem of increased processing time for correcting distortion.

DESCRIPTION OF THE DRAWINGS

FIG. 1 is a schematic block diagram of a configuration of an image processing apparatus according to an embodiment.

FIG. 9B is a diagram illustrating an example of temporary fitting data created based on the distortion data in FIG. 9A.

FIG. 9C is a diagram illustrating an example of fitting data created from the temporary fitting data illustrated in FIG. 9B.

DETAILED DESCRIPTION

Embodiments provide an image processing apparatus and a distortion correction coefficient calculation method capable of reducing processing time required for distortion correction.

In general, according to one embodiment, an image processing apparatus includes an input buffer, a processor configured to convert a position of an input pixel of an input image received into the input buffer into a first pixel position of an output image using a first conversion function, convert a position of an output pixel in a vicinity of the first pixel position of the output image into a second pixel position of the input image using a second conversion function, calculate a pixel value of the second pixel position by interpolation using pixels of the input image that are in a vicinity of the second pixel position of the input image, and output the position of the output pixel as a corrected position of the input pixel and the calculated pixel value as a pixel value at the corrected position. The first conversion function is an n-order polynomial function derived according to correction data that correlates distorted pixel positions with corrected pixel positions and the second conversion function is an m-order polynomial function derived according to the correction data and an inverse function of the first conversion function, and n and m are selected from a set of possible n values and a set of possible m values.

Hereinafter, embodiments will be described with reference to the drawings.

First Embodiment

FIG. 1 is a schematic block diagram of an image processing apparatus according to a first embodiment of the present disclosure. A super-wide angle lens may be used by a camera for preventing collision of a car, or by another monitoring device. Such uses of super-wide angle lenses cause increased distortion aberration or chromatic aberration during magnification. The image processing apparatus illustrated in FIG. 1 electrically corrects such image distortion by image processing.

Figure 2A:
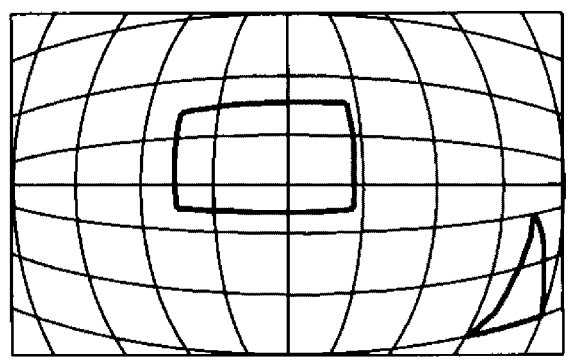
FIG. 2A is a diagram of an example of an image having barrel-shaped distortion aberration.
Figure 2B:
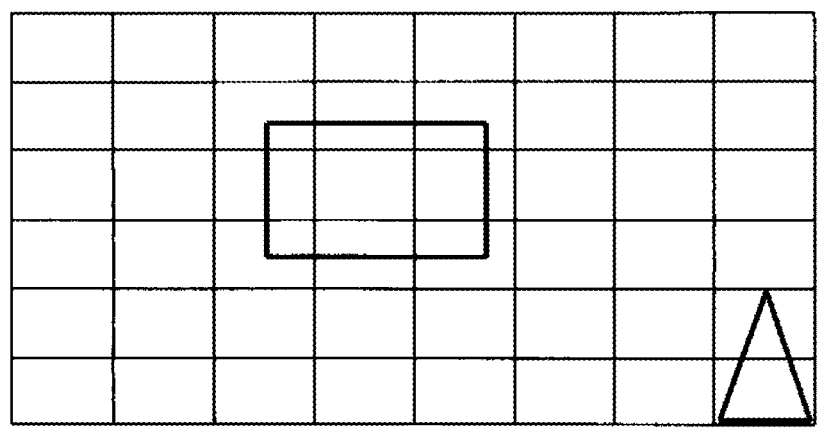
FIG. 2B is a diagram of an example of an image after correction of the distortion aberration.

FIG. 2A illustrates barrel-shaped distortion aberration of an image. FIG. 2B illustrates an image after correction of the distortion aberration. When an image is captured using a wide-angle lens, as illustrated in FIG. 2A, a straight line at the periphery of a screen is spread and curved outward. As a result, the image appears to bulge outward from the center of the screen. The image processing apparatus illustrated in FIG. 1 can electrically correct the distortion aberration of the image illustrated in FIG. 2A, to convert the image into an undistorted image as illustrated in FIG. 2B.

The image processing apparatus illustrated in FIG. 1 includes a CPU 25. The CPU 25 executes a program stored in a memory (not illustrated), and controls each unit of the image processing apparatus. An imaging unit 22 includes an image pickup device (not illustrated) such as a CMOS sensor. The imaging unit 22 obtains an image signal as a captured image, by photoelectrically converting an optical image by the image pickup device. In this way, the optical image is obtained via an optical system (not illustrated). The captured image output of the imaging unit 22 is input to the image processing apparatus 21, and distortion correction is performed on the captured image. The corrected image is input to a DRAM 24 via a bus 23 and is stored in the DRAM 24. The captured image, which is output from the imaging unit 22, includes distortion aberration and the like from the optical system. This distortion is corrected by the image processing apparatus 21, which performs various image processing.

The captured image is output from the imaging unit 22 in a raster scan order to a distortion correction circuit 1 of the image processing apparatus 21.

The distortion correction circuit 1 corrects the inputted captured image using a parameter stored in a memory 4. The distortion correction circuit outputs the corrected image to a post-processing circuit 2.

The post-processing circuit 2 performs gamma correction, color space correction, and the like on the input image, and then outputs the corrected image to a buffer circuit 3.

The buffer circuit 3 temporarily stores the input image, and then outputs the image to the DRAM 24 via the bus 23. Thereby, the distortion-corrected image is stored in the DRAM 24.

Figure 3:
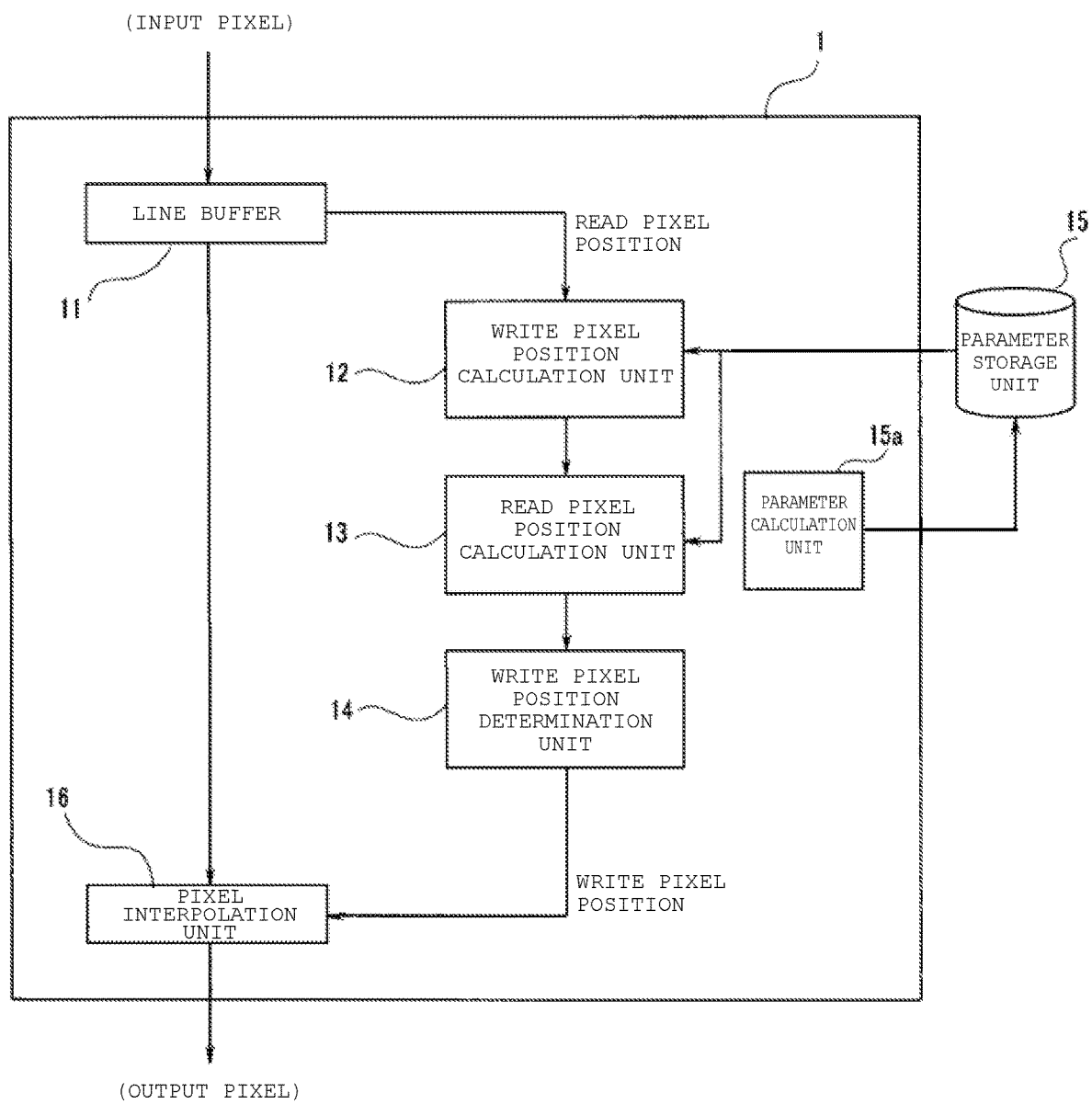
FIG. 3 is a schematic block diagram of a distortion correction circuit in FIG. 1.

FIG. 3 is a schematic block diagram of a configuration of the distortion correction circuit 1 in FIG. 1. The distortion correction circuit 1 mainly includes a line buffer 11, and a processor which is programmed to perform the functions of a write pixel position calculation unit 12, a read pixel position calculation unit 13, a write pixel position determination unit 14, and a pixel interpolation unit 16, described below.

The line buffer 11 stores pixels (input pixels) of the input image, which are read from an imaging device in raster scan order, according to the number of lines required for correction processing. For example, when using bilinear interpolation for correcting distortion aberration, the line buffer 11 stores pixels of one to two lines.

The write pixel position calculation unit 12 extracts a pixel to be corrected (hereinafter, referred to as a read pixel Pi) from the input pixels that are read in the line buffer 11 in raster scan order. The write pixel position calculation unit 12 calculates a write pixel area, which is estimated to include pixels interpolated by using the read pixel Pi. Specifically, a read pixel position set is defined for these calculations. The set includes four neighbor pixels {Pi0 (vo, ho), Pi1 (vo, ho−1), Pi2 (vo−1, ho−1), and Pi3 (vo−1, ho)} and includes a position (vo, ho) of the read pixel Pi. Hereinafter, the read pixel is referred to as a pixel Pi (vo, ho)). In the following description, for a pixel position coordinate (v, h), indicates a vertical pixel position and h indicates a horizontal pixel position wherein the upper left of the image is set as the origin (0, 0).

Figure 4:
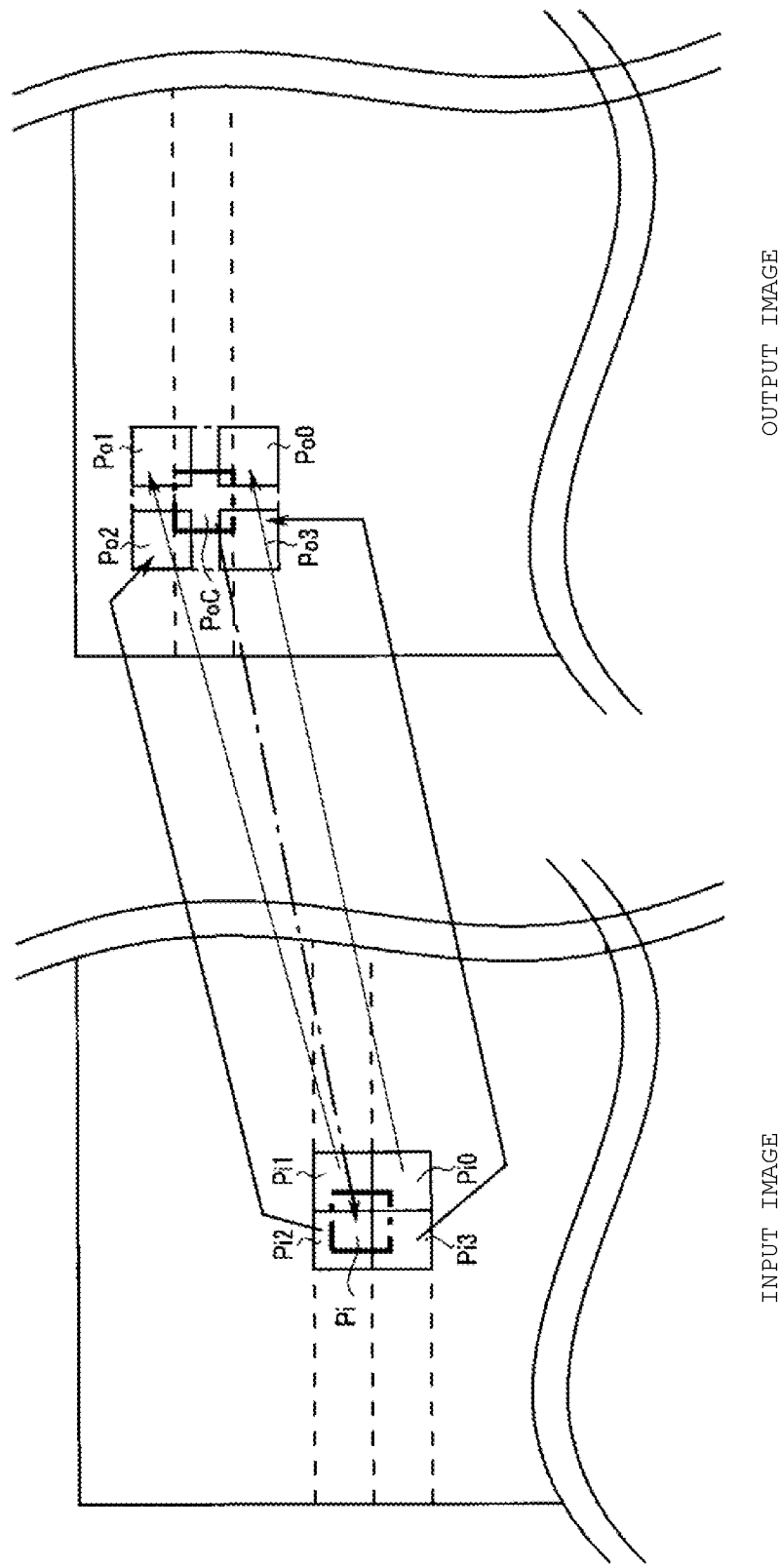
FIG. 4 shows correspondence between pixels of an input image and pixels of an output image.

FIG. 4 illustrates correspondence between pixels of an input image and pixels of an output image. As illustrated in FIG. 4, positions (vo', ho'), (vo', ho−1'), (vo−1', ho−1'), and (vo−1', ho') of write pixels Po0, Po1, Po2, and Po3 correspond to the read pixels Pi0, Pi1, Pi2, and Pi3, and are calculated using a conversion function of pixel position calculation. The write pixel area of the output image consists of a rectangular area including four pixels Po0 (vo', ho'), Po1 (vo', ho−1'), Po2 (vo−1', ho−1'), and Po3 (vo−1', ho') as vertices.

A general conversion function for pixel position calculation such as a polynomial or a grid table conversion function may be used to calculate pixel position. A conversion function is chosen for which an inverse function exists.

The read pixel position calculation unit 13 extracts a pixel position in the write pixel area (write pixel candidate Poc (v', h')) in which both the vertical position and a horizontal position are integers. The read pixel position calculation unit 13 calculates a read pixel Pi (v", h") corresponding to the write pixel candidate Poc (v', h'), by performing pixel position calculation. The pixel position is calculated by using an inverse function of the conversion function that is used to calculate pixel position by the write pixel position calculation unit 12. When there are a plurality of write pixel candidates, read pixels Pi (v", h") are calculated for all of the write pixel candidates Poc (v', h').

When the read pixel Pi (v", h") is included in the read pixel position set, the write pixel position determination unit 14 determines the write pixel candidate Poc (v', h') corresponding to the read pixel Pi (v", h"), as a write pixel Po (v', h').

A parameter calculation unit 15a is a pixel position calculation function generation unit. This unit calculates a parameter of the conversion function used by the write pixel position calculation unit 12 to calculate the write pixel position. In addition, the parameter calculation unit 15a calculates a parameter of the inverse function used by the read pixel position calculation unit 13. Further, the parameter calculation unit 15a calculates an order of the conversion function used in the pixel position calculation and an order of the inverse function used in the pixel position calculation. The calculated parameters and orders are stored in a parameter storage unit 15, which is provisioned in the memory 4.

The pixel interpolation unit 16 calculates a pixel value of the read pixel Pi (v", h") that corresponds to the determined write pixel Po (v', h'). Usually, a coordinate of the read pixel Pi (v", h") is a non-integer. For this reason, the pixel interpolation unit 16 calculates the pixel value by an existing interpolation method such as bilinear interpolation using four neighbor pixels. The calculated pixel value is output as a pixel value of the write pixel Po (v', h'). The output pixel value is stored in a memory (not illustrated) such as a DRAM. Since the output pixel is output in order of correction, the position of the output pixel is random.

Figure 5:
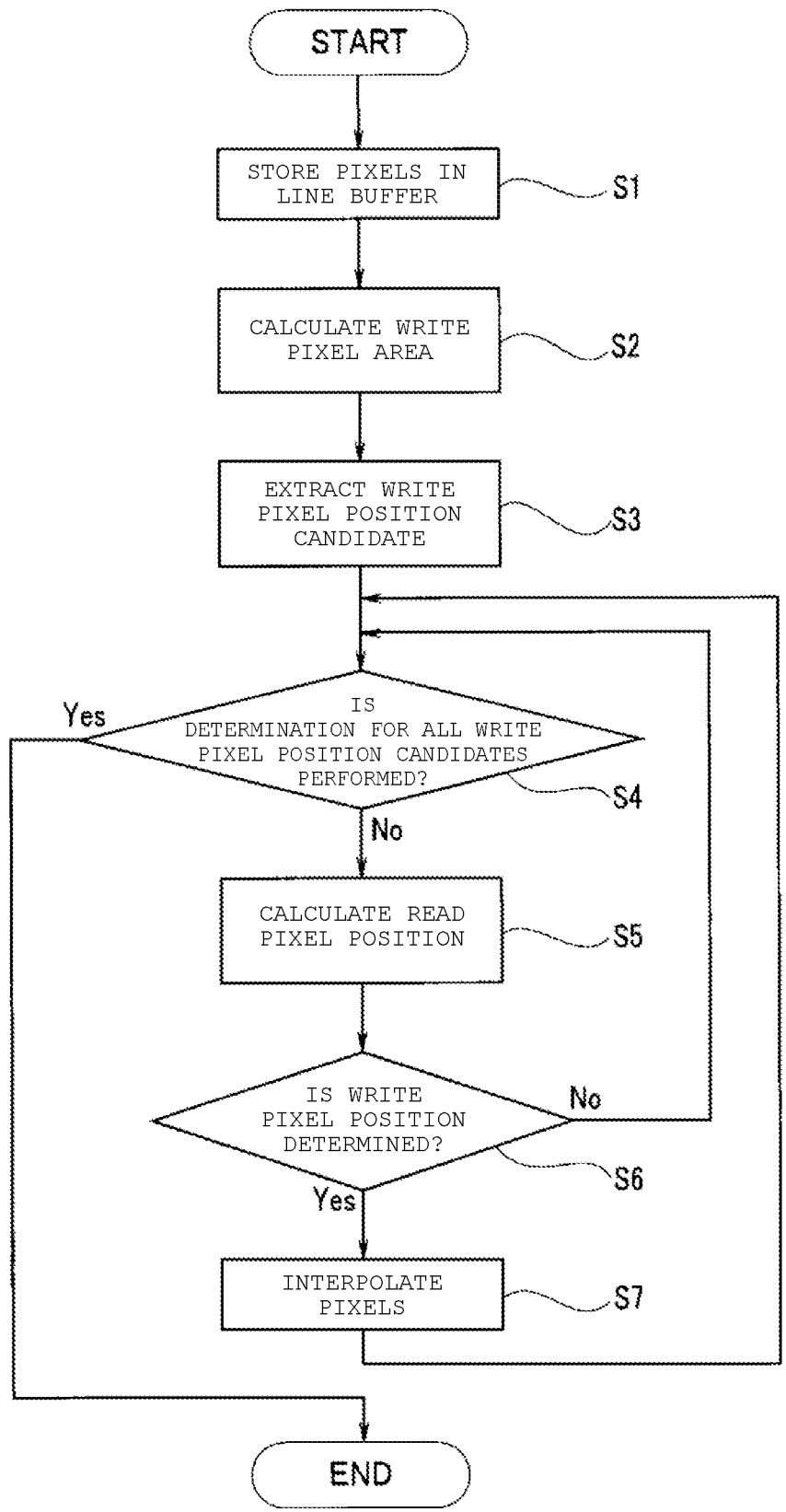
FIG. 5 is a flowchart of distortion correction processing.

Next, a procedure of distortion correction by the distortion correction circuit 1 will be described. FIG. 5 is a flowchart of distortion correction processing according to the first embodiment.

First, in step S1, the pixels, which are input into the distortion correction circuit 1 in raster scan order, are stored in the line buffer 11. The line buffer 11 stores the input pixels by the number of lines required for processing by the pixel interpolation unit 16. For example, bilinear interpolation requires pixel values of 2×2 pixels (four pixels) around a pixel to be interpolated. In this case the line buffer 11 stores pixel values of pixels by at least one to two lines.

Next, in step S2 a read pixel Pi (vo, ho) is specified as a pixel to be corrected and a write pixel area estimate is calculated to include a pixel interpolated using the read pixel Pi. Specifically, first, a set of four neighbor pixels {Pi0 (vo, ho), Pi1 (vo, ho−1), Pi2 (vo−1, ho−1), and Pi3 (vo−1, ho)} including the read pixel Pi (vo, ho) is defined. That is, Pi0 (vo, ho) is a lower-right pixel of Pi (vo, ho), Pi1 (vo, ho−1) is an upper-right pixel of Pi (vo, ho), Pi2 (vo−1, ho−1) is an upper-left pixel of Pi (vo, ho), and Pi3 (vo−1, ho) is a lower-left pixel of Pi (vo, ho). Next, pixel position calculation is performed for each of the pixels Pi0, Pi1, Pi2, and Pi3, and each of the write pixels Po0 (vo', ho'), Po1 (vo', ho−1'), Po2 (vo−1', ho−1'), and Po3 (vo−1', ho') corresponding to the pixels Pi0, Pi1, Pi2, and Pi3.

The following procedure is an example of pixel position calculation by using a polynomial function.

(a) Calculation of Image Height: A position of the input pixel is converted from a coordinate system (v, h) with the upper left as the origin, into a coordinate system (x, y) wherein the optical center is the origin. In both coordinate systems, a right side in a horizontal direction is positive, and a lower side in a vertical direction is positive. A distance (image height) r from the optical center to the input pixel is calculated. This calculation uses the following Equations (1) to (3).

$$y = v_{in} + [\text{SENSOR\_CROP\_OFS\_V}] \quad \text{Equation (1)}$$

$$x = h_{in} + [\text{SENSOR\_CROP\_OFS\_H}] \quad \text{Equation (2)}$$

$$r = \sqrt{x^2 + y^2} * [\text{NORM\_SCALE}] \quad \text{Equation (3)}$$

In Equation (1), $v_{in}$ is a position of the input pixel in the vertical direction (non-negative number), and [SENSOR_CROP_OFS_V] is a vertical pixel position offset from the optical center, namely a vertical offset between the optical center and the origin of the (v, h) coordinate system. In Equation (2), $h_{in}$ is a position of the input pixel in the horizontal direction (non-negative number), and [SENSOR_CROP_OFS_H] is a horizontal pixel position offset from the optical center, namely a horizontal offset between the optical center and the origin of the (v, h) coordinate system. In Equation (3), [NORM_SCALE] is a normalization coefficient as a non-negative number.

When the image center and the optical center match each other, [SENSOR_CROP_OFS_V] and [SENSOR_CROP_OFS_H] become the following Equations (4) and (5), respectively.

$$[\text{SENSOR\_CROP\_OFS\_V}] = -(\text{vertical input image size}/2 - 0.5) \quad \text{Equation (4)}$$

$$[\text{SENSOR\_CROP\_OFS\_H}] = -(\text{horizontal input image size}/2 - 0.5) \quad \text{Equation (5)}$$

(b) Calculation of Image Height Scale in Pixel Position Calculation: This calculates a distance r_scale through which a point at a distance r from the optical center moves toward the optical center by pixel position conversion. The following Equation (6) is used.

$$\begin{aligned} r\_scale &= \sum_{n=0}^{10} (r^n * Pn) \\ &= P0 + r*P1 + r^{2*}P2 + r^{3*}P3 + r^{4*}P4 + \\ &\quad r^{5*}P5 + r^{6*}P6 + r^{7*}P7 + r^{8*}P8 + \\ &\quad r^{9*}P9 + P10*r^{10} \end{aligned} \quad \text{Equation (6)}$$

In Equation (6), Px (x=0 to 10) is a polynomial coefficient, which is a parameter of the conversion function that corresponds to each order.

The function f(r) converts a distorted position of a point at a distance r from the optical center into a distortion-corrected ideal position, and may be represented as the following Equation (6').

$$f(r) = r * \sum_{n=0}^{10} (r^n * Pn) \quad \text{Equation (6')}$$

(c) Calculation of Position of Output Pixel: This calculation converts the position of the input pixel into a position of an output pixel using the image height scale, and returns position values to the (v, h) coordinate system. This processing is performed using the following Equations (7) and (8).

$$v_{out} = r\_scale*y - [\text{SENSOR\_CROP\_OFS\_V}] \quad \text{Equation (7)}$$

$$h_{out} = r\_scale*x - [\text{SENSOR\_CROP\_OFS\_H}] \quad \text{Equation (8)}$$

In Equation (7), $v_{out}$ is a position of the output pixel in the vertical direction as a non-negative number. In Equation (8), $h_{out}$ is a position of the output pixel in the horizontal direction as a non-negative number.

The calculations from (a) to (c) above convert the read pixels Pi0 (vo, ho), Pi1 (vo, ho−1), Pi2 (vo−1, ho−1), and Pi3 (vo−1, ho) respectively into the write pixels Po0 (vo', ho'), Po1 (vo', ho−1'), Po2 (vo−1', ho−1'), and Po3 (vo−1', ho').

When a polynomial function as described above is used to calculate pixel position, each of the parameters [SENSOR_CROP_OFS_V], [SENSOR_CROP_OFS_H], and [NORM_SCALE] is set in advance and stored in the parameter storage unit 15. In addition, each parameter of Px (x=0 to 10) is calculated in advance by the parameter calculation unit 15a and is stored in the parameter storage unit 15. Further, the order of the polynomial represented in Equations (6) and (6') is calculated in advance by the parameter calculation unit 15a and is stored in the parameter storage unit 15.

The write pixel area is calculated as a rectangle that includes the four pixels Po0 (vo', ho'), Po1 (vo', ho−1'), Po2 (vo−1', ho−1'), and Po3 (vo−1', ho') as vertices.

Next, within the area of the calculated rectangle, a write pixel candidate Poc (v', h') position is extracted having integer values for both the vertical coordinate and the horizontal coordinate. For example, adjustment or integer conversion of the coordinate of each of the pixels Po0 (vo', ho'), Po1 (vo', ho−1'), Po2 (vo−1', ho−1'), and Po3 (vo−1', ho') is performed by raising or lowering their values. All pixel positions in the rectangular area, which circumscribes the obtained pixel position, are set as write pixel candidates Poc (v', h') (S3). The following Equations (21) and (22) are used to calculate the new, adjusted integer values. In this adjustment of the coordinate for each of the four pixels, Equation (21) is used to adjust the horizontal coordinate on a left side of the rectangular area specified as the write pixel area and the vertical coordinate on an upper side of the rectangular area. Equation (22) is used to adjust the horizontal coordinate on a right side of the rectangular area and the vertical coordinate on a lower side of the rectangular area. That is, Equation (21) is used to lower the horizontal coordinate vo−1' and the vertical coordinate ho−1', and Equation (22) is used to raise the horizontal coordinate vo' and the vertical coordinate ho'.

$$\text{Adjusted pixel coordinate} = [\text{write pixel coordinate} - \text{WRITE\_AREA\_DELTA}] \quad \text{Equation (21)}$$

$$\text{Adjusted pixel coordinate} = [\text{write pixel coordinate} + \text{WRITE\_AREA\_DELTA}] \quad \text{Equation (22)}$$

In both Equations (21) and (22), WRITE_AREA_DELTA is a preset value that is used to make the adjustment. Here, [ ] represents a Gaussian symbol.

A determination is then made whether the write pixel candidate Poc (v', h') is a write pixel Po (v', h') for each of the write pixel candidates Poc (v', h') obtained in step S3. When a determination is not made for a write pixel candidate Poc (v', h') as a No result in step S4, the corresponding read pixel Pi (v'', h'') is calculated by pixel position calculation in step S5. The inverse function in step S2 is used to calculate pixel position. A polynomial coefficient of the inverse function (a parameter of the inverse function) is calculated in advance by the parameter calculation unit 15a and is stored in the parameter storage unit 15. In addition, the order of the polynomial of the inverse function is also calculated in advance by the parameter calculation unit 15a and is stored in the parameter storage unit 15. The vertical coordinate and the horizontal coordinate of the calculated read pixel Pi (v", h") are non-integers.

Next, pixels, which are required for calculating a pixel value of the read pixel Pi (v", h") by interpolation, are specified. For example, when calculating the pixel value by bilinear interpolation, four pixels around the read pixel Pi (v", h") are specified for the interpolation. When all the pixels required for interpolation are included in the set, the write pixel candidate Poc (v', h'), which corresponds to the read pixel Pi (v", h") is deemed the write pixel Po (v', h'). This is represented as "Yes" in step S6.

In this case, the pixel value of the determined write pixel Po (v', h') is calculated by pixel interpolation using the pixel value of the corresponding read pixel Pi (v", h"), and is output in step S7. The output pixel Po (v', h') does not follow a raster scan order but is in random order. Subsequently, the process returns to step S4, and a decision is made whether an undetermined write pixel candidate Poc (v', h') exists.

On the other hand, when a pixel is not included in the set, among the pixels required for interpolation, the write pixel candidate Poc (v', h') corresponding to the read pixel Pi (v", h") is not the write pixel Po (v', h'). This is represented as "No" in step S6. In this event, pixel interpolation is not performed, and the process returns to step S4 to determine whether there is an undetermined write pixel candidate Poc (v', h').

At step S4, when it is determined that step S3 has been executed for all of the write pixel candidates Poc (v', h'), then the image correction processing series of step is ended.

Figure 6:
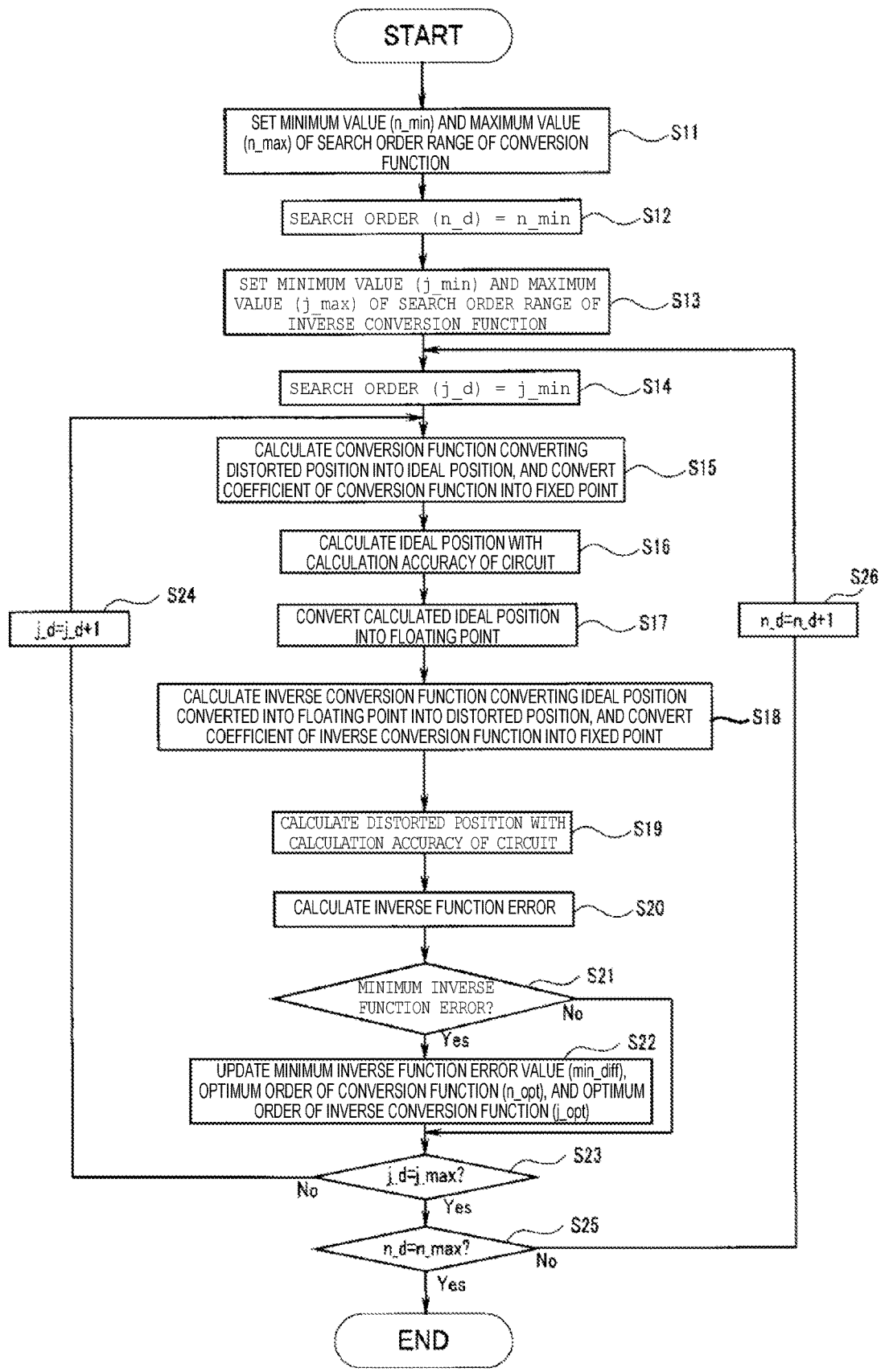
FIG. 6 is a flowchart of distortion correction coefficient calculation processing according to a first embodiment.

Next described is the parameter calculation unit 15a, which calculates the polynomial coefficient, the order of the conversion function f(r) and the polynomial coefficient, and the order of the inverse function $f^{-1}(r)$. Since the conversion function is a function that corrects the distorted position to an ideal position, in the following description, the polynomial coefficient is referred to as a distortion correction coefficient. FIG. 6 is a flowchart for calculating the distortion correction coefficient according to the first embodiment. In this procedure, based on a calculation accuracy of the circuit, the optimal order of the conversion function and the distortion correction coefficient according to each order are calculated. The optimal order of the inverse function and the distortion correction coefficient according to each order are also calculated.

First, in step S11 a range for searching the optimal order of the distortion correction function f(r) is set. In general, the distortion correction function f(r) and the inverse function $f^{-1}(r)$ used in the pixel position conversion have smaller conversion errors as their orders are higher. On the other hand, a problem in calculation accuracy of the circuit causes a calculation accuracy error of the conversion function, and thus the conversion error is not necessarily minimized at the highest order. For this reason, in this embodiment, a search is made for an order of the distortion correction function f(r) and an order of the inverse function $f^{-1}(r)$, that provide the smallest conversion error.

The order of the distortion correction function using a general polynomial is approximately a tenth-order. Thus, for example, a maximum value (n_max) of the search range is set to 10, and a minimum value (n_min) of the search range is set to 0. In this embodiment explained next, the optimum order of the distortion correction function f(r) is searched within the range from zero-order to tenth-order. The first searched order for the distortion correction function f(r) is set as step S12. For example, when the search starts from a lower order to a higher order of the search range, a minimum value (n_min) of the search range is set as the order to be searched (search order n_d).

Step S13 then sets a range for searching the optimum order of the inverse function $f^{-1}(r)$ of the distortion correction function. A maximum value (j_max) and a minimum value (j_min) of the search range are not necessarily set to the same values as the values of the search range of the order of the distortion correction function f(r). For example, when the maximum value (j_max) of the search range is set to 10 and the minimum value (j_min) of the search range is set to 0, the optimum order of the inverse function $f^{-1}(r)$ is subsequently searched in the range from zero-order to tenth-order.

Subsequently, in step S14, a first order to be searched for the inverse function $f^{-1}(r)$ of the distortion correction function is set. For example, when the search starts from a lower order to a higher order of the search range, a minimum value (j_min) of the search range is set as the order to be searched (search order j_d).

Next, step S15 uses distortion data that is unique for each lens in the optical system to fit the distorted position to the ideal position. Specifically, the distortion correction function f(r) is calculated via polynomial fitting using the search order (n_d). At this time, the fitting is a floating point calculation. An existing algorithm such as a least-square method may be used for this fitting. The fitting is completed, and the obtained polynomial coefficient is converted into a fixed point having a calculation accuracy determined by the circuit.

Subsequent step S16 calculates an ideal position from the distorted position, using the distortion correction function f(r) from step S15 where the polynomial coefficient was converted into a fixed point. In step S17 the calculated ideal position with a fixed point is converted into a floating point value.

Next, the floating point result from step S17 is converted into the original distorted position in step S18. Specifically, the inverse function $f^{-1}(r)$ of the distortion correction function is calculated using polynomial fitting with the search order (j_d). At this time, the fitting is performed by a floating point operation. For the fitting, an existing algorithm such as a least-square method may be used. The fitting is completed, and the obtained polynomial coefficient is converted into a fixed point with the calculation accuracy determined by the circuit.

Step S19 calculates a distorted position from the ideal position, using the inverse function $f^{-1}(r)$ of the distortion correction function to which the polynomial coefficient was converted into a fixed point in S18. Subsequently in step S20, a difference between the distorted position calculated in step S19 and the distorted position which is input to the distortion correction function f(r) in step S16 is calculated, and the difference is set as an inverse function error.

When the inverse function error calculated in step S20 is smaller than the inverse function error calculated thus far (a "Yes" result in step S21), a minimum inverse function error value (min_diff) is updated with the inverse function error value calculated in step S20. In addition, the optimum order (n_opt) of the distortion correction function f(r) is updated with the search order (n_d). Further in step S22, the optimum order (j_opt) of the inverse function $f^{-1}(r)$ of the distortion correction function is updated with the search order (j_d). After these three values are updated, the process proceeds to step S23.

On the other hand, when the inverse function error calculated in step S20 is not smaller than the inverse function error calculated so far (a "No" result in step S21), the process proceeds to step S23. This step determines whether the search order (j_d) of the inverse function $f^{-1}(r)$ of the distortion correction function is the maximum value (j_max) of the search range. When the search order (j_d) is not the maximum value (j_max) of the search range (a "No" result in step S23), the search order (j_d) is increased by 1 for step S24, and a series of procedures from step S15 to step S22 is repeated.

When the search order (j_d) of the inverse function $f^{-1}(r)$ of the distortion correction function is the maximum value (j_max) of the search range (a "Yes" in step S23), step S25 determines whether the search order (n_d) of the distortion correction function f(r) is the maximum value (n_max) of the search range. When the search order (n_d) is not the maximum value (n_max) of the search range (a "No" result in step S25), step S26 increases the search order (n_d) by 1, and a series of procedures from step S14 to step S22 is repeated.

When the search order (n_d) of the distortion correction function f(r) is the maximum value (n_max) of the search range (a "Yes" decision in step S25), the distortion correction coefficient calculation processing ends. That is, when the series of procedures illustrated in FIG. 6 ends, the value which is set to the optimum order (n_opt) is the optimum order of the distortion correction function f(r), and the value which is set to the optimum order (j_opt) is the optimum order of the inverse function $f^{-1}(r)$ of the distortion correction function Thus, the polynomial coefficient of the distortion correction function f(r) is calculated by polynomial fitting using the search order (n_opt), and the polynomial coefficient of the inverse function $f^{-1}(r)$ of the distortion correction function is calculated by polynomial fitting using the search order (j_opt). The parameter storage unit 15 stores these two polynomial coefficients.

As described above, the parameter calculation unit 15a calculates the order and the polynomial coefficient parameters with the smallest inverse function error between the function for converting the distorted position into the ideal position and the function for converting the ideal position into the distorted position. These calculations are subject to calculation accuracy of the circuit. The pixel position conversion uses the distortion correction function f(r) or the inverse function $f^{-1}(r)$ of the distortion correction function, and the parameters are applied to the distortion correction function f(r) and the inverse function $f^{-1}(r)$ Because of this, it is possible to reduce processing time for correcting distortion.

Second Embodiment

In the image processing apparatus according to the first embodiment, the parameter calculation unit 15a obtains the distortion correction function f(r) by a fitting process. This process corrects the distorted position to the ideal position, using the distortion data obtained from the design of the optical system. On the other hand, the second embodiment differs in that the fitting is performed after the "fitting data" are narrowed down from the distortion data. The image processing apparatus according to this second embodiment has the same configuration as that of the first embodiment. Hereinafter, a method is described that narrows down a fitting data range before calculation of the distortion correction coefficient. The same components and the same processing steps are denoted by the same reference numerals, and further descriptions thereof are omitted.

Figure 7:
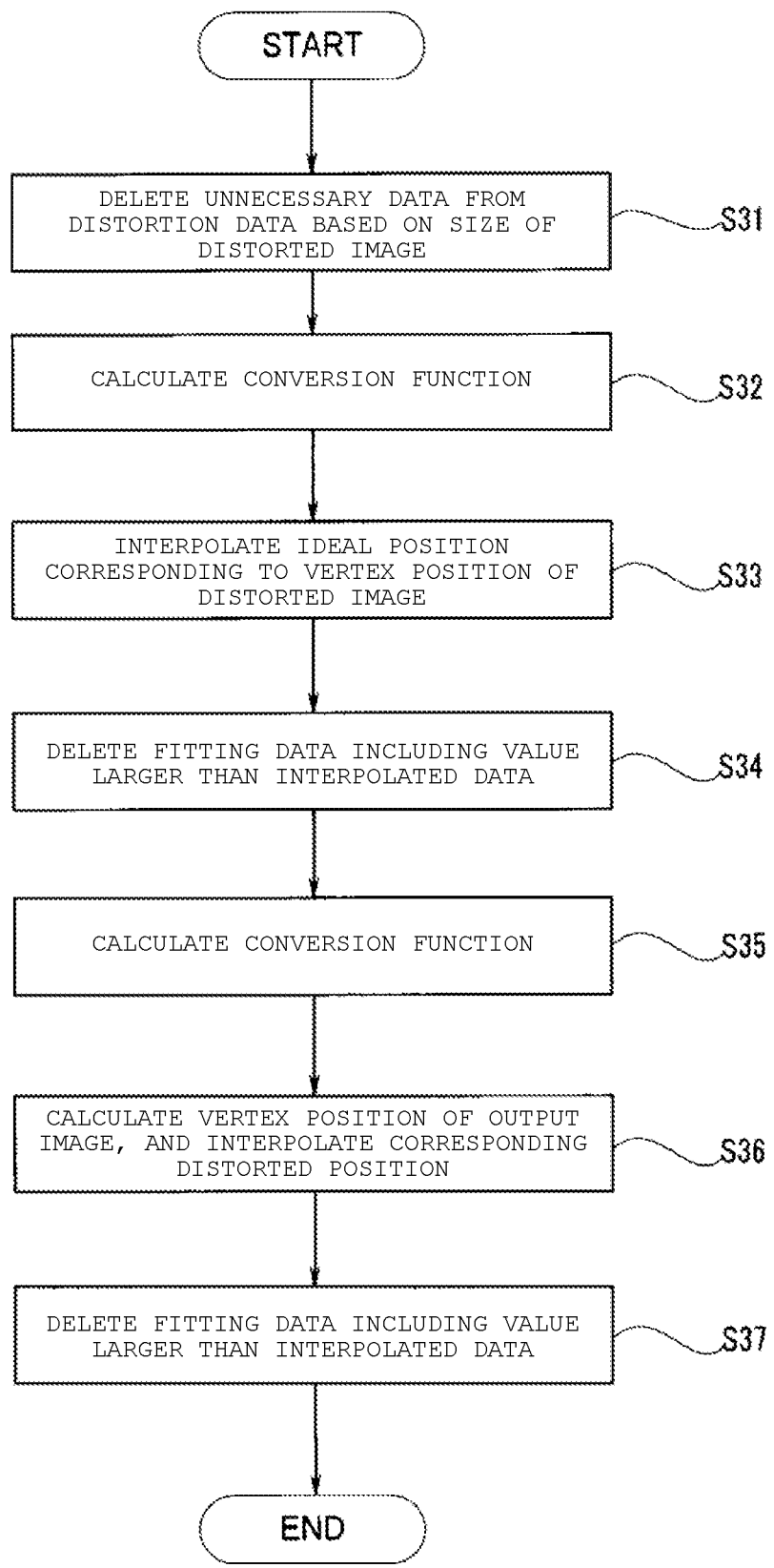
FIG. 7 is a flowchart of a decreased processing of a fitting data range according to a second embodiment.
Figures 8, 9A:
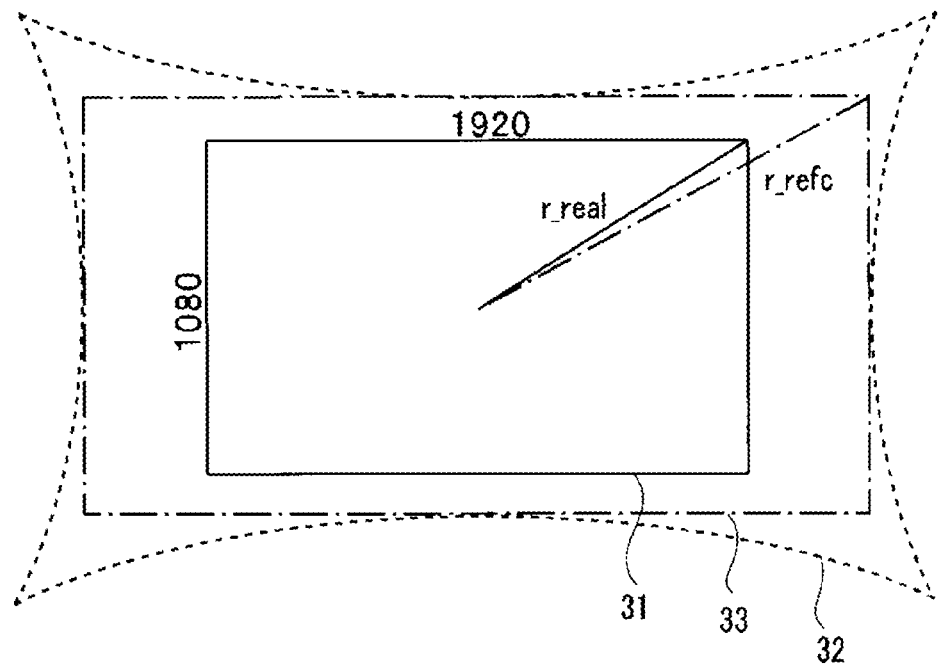
FIG. 8 shows pixel areas of an input image and an output image.
FIG. 9A is a diagram illustrating an example of distortion data.

FIG. 7 is a flowchart that shows limited processing of the fitting data range according to the second embodiment. FIG. 8 illustrates pixel areas of an input distorted image and an output ideal image. FIG. 9A illustrates an example of distortion data. FIG. 9B illustrates an example of temporary fitting data created from the distortion data of FIG. 9A, and FIG. 9C illustrates an example of fitting data created from using the temporary fitting data of FIG. 9B. In the following description, it is assumed that the ideal image is output as a rectangular image.

First, step S31 creates temporary fitting data by deleting unnecessary data from distortion data based on size of a distorted image. FIG. 8 shows distorted image 31, wherein a distance from the image center to a farthest pixel is a distance from the image center to a vertex of a rectangle (r_real). Based on this fact, the temporary fitting data is created by extracting a range that includes a distorted position r_real from the distortion data and by deleting data outside the extracted range.

For example, when the distorted image size 31 is 1920 in a vertical direction and 1080 in a horizontal direction, the distorted position r_real is $\{(1920/2)^2+(1080/2)^2\}^{(1/2)}=$ 1101.45. In addition, as illustrated in FIG. 9A, the distortion data are input at an interval of 200. That is, the distortion data are assumed to include distorted positions of . . . , 200, 400, 800, 1000, 1200, 1400, . . . and ideal positions corresponding to these distorted positions, is input. In this case, the distortion data ranges up to 1200, which includes the distorted position of 1101.45. Therefore, distortion data after the distorted position of 1400 are deleted.

Next, the range narrowed data from step S31, which may be termed temporary fitting data, is used to calculate fitting in step S32 by a determining a conversion function. The conversion function is a distortion correction function f(r) that corrects the distorted position to the ideal position. Subsequently, step S33 calculates the ideal position by correcting the distorted position r_real using the conversion function from step S32. That is, the distorted position r_real and the ideal position that is calculated in step S33 and corresponding to the distorted position are generated by interpolation, and are added to the temporary fitting data. For example, when the ideal position obtained by correcting the distorted position r_real=1101.41 is 1451.15, the temporary fitting data includes the distorted positions of . . . , 200, 400, 800, 1000, 1101.45, and 1200, and includes the ideal positions corresponding to these distorted positions.

Subsequently, step S34 deletes data that include a position value larger than the distorted position r_real from the temporary fitting data. In the above-described example, data including the distorted position of 1200 are deleted from the temporary fitting data.

Next, step S35 calculates a conversion function that is a distortion correction function f(r) which corrects the distorted position to the ideal position. This function is calculated by fitting, using the temporary fitting data having a range that was narrowed down in step S34. Subsequently, the conversion function calculated in step S35 is used to correct the distorted image 31 to create an ideal image 32. The ideal image 32 is used to specify a range of the output image 33. Using the output image 33, a distance (r_refc) from the image center to a farthest pixel is calculated.

The output image 33 is a rectangular area inscribed in the ideal image 32. Therefore, the distance (r_refc) from the image center to a vertex of the rectangular area of the output image 33 can be calculated as follows. First, a position of a pixel at a right end (or a left end) of the distorted image 31 is calculated, and the pixel position is converted into an ideal position using the conversion function calculated in step S35. Next, a position of a pixel at an upper end (or a lower end) of the distorted image 31 is calculated, and the pixel position is converted into an ideal position using the conversion function calculated in step S35. After these distance calculations, the distance (r_refc) from the center pixel to the vertex of the rectangular area, which is the output image 33, is calculated by applying the Pythagorean theorem.

Subsequently in step S36, an inverse function of the conversion function calculated in step S35 is obtained. This inverse function is used to calculate the distorted position corresponding to the ideal position r_refc. That is, the ideal position r_refc and the distorted position calculated in step S36 that correspond to the ideal position are generated by interpolation, and are added to the temporary fitting data. For example, in the output image 33, when the ideal position (r_refc) farthest from the image center is 1234.56 and the distorted position corresponding to the ideal position is 915.12, the temporary fitting data includes the distorted positions of . . . , 200, 400, 800, 915.12, 1000, and 1101.45, and includes the ideal positions corresponding to the distorted positions.

Finally in step S37 data are deleted that include a position value larger than the ideal position r_refc from the temporary fitting data. This ends the procedure of narrowing down the fitting data range. In the above-described example, temporary fitting data are deleted that include the distorted positions of 1000 and 1101.

As described above, when calculating the distortion correction function f(r) to correct the distorted position to the ideal position, it is possible to improve accuracy of the fitting by deleting fitting data outside the data range used in pixel position conversion. This allows further reduction in the inverse function error between the function for converting the distorted position into the ideal position and the function for converting the ideal position into the distorted position. This also allows reduction in the processing time to correct distortion.

In the above description, although the rectangular area inscribed in the ideal image is described as the output image, a range and a shape of the output image are not limited thereto. For this reason, as a method of calculating the distance (r_refc) from the image center to the farthest pixel in the output image, a method according to the range and the shape of the output image may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   an input buffer; and
   a processor configured to:
   convert a position of an input pixel of an input image received into the input buffer into a first pixel position of an output image using a first conversion function;
   convert a position of an output pixel in a vicinity of the first pixel position of the output image into a second pixel position of the input image using a second conversion function;
   calculate a pixel value of the second pixel position by interpolation using pixels of the input image that are in a vicinity of the second pixel position of the input image; and
   output the position of the output pixel as a corrected position of the input pixel and the calculated pixel value as a pixel value at the corrected position, wherein
   the first conversion function is an n-order polynomial function derived according to correction data that correlates distorted pixel positions with corrected pixel positions and the second conversion function is an m-order polynomial function derived according to the correction data and an inverse function of the first conversion function, and n and m are selected from a set of possible n values and a set of possible m values, wherein
   the first conversion function is derived using a fixed point operation and the second conversion function is derived using a floating point operation, and
   the selected n and m generate a smallest amount of inverse function error among all possible combinations of n values and m values, where the inverse function error is equal to a difference between an input pixel position and an output pixel position that is generated using the input pixel position, the first conversion function having the order n, and the second conversion function having the order m.

2. The image processing apparatus according to claim 1, wherein
   the input pixel position is input into the first conversion function to generate an interim pixel position, and the interim pixel position is input into the second conversion function to generate the output pixel position.

3. The image processing apparatus according to claim 2, wherein n and m are the same.

4. The image processing apparatus according to claim 2, wherein n and m are different.

5. A method of correcting image distortion in an input image, said method comprising:
   deriving a first conversion function as an n-order polynomial function according to correction data that correlates distorted pixel positions with corrected pixel positions;
   deriving a second conversion function as an m-order polynomial function that is an inverse function of the first conversion function, according to the correction data;
   selecting n and m from a set of possible n values and a set of possible m values;
   converting a position of an input pixel of the input image into a first pixel position of an output image using the first conversion function;
   converting a position of an output pixel in a vicinity of the first pixel position of the output image into a second pixel position of the input image using the second conversion function;
   calculating a pixel value of the second pixel position by interpolation using pixels of the input image that are in a vicinity of the second pixel position of the input image; and outputting the position of the output pixel as a corrected position of the input pixel and the calculated pixel value as a pixel value at the corrected position, wherein the first conversion function is derived using a fixed point operation and the second conversion function is derived using a floating point operation, and the selected n and m generate a smallest amount of inverse function error among all possible combinations of n values and m values, where the inverse function error is equal to a difference between an input pixel position and an output pixel position that is generated using the input pixel position, the first conversion function having the order n, and the second conversion function having the order m.

6. The method according to claim 5, wherein the input pixel position is input into the first conversion function to generate an interim pixel position, and the interim pixel position is input into the second conversion function to generate the output pixel position.

7. The method according to claim 6, wherein n and m are the same.

8. The method according to claim 6, wherein n and m are different.

9. An image processing apparatus comprising:

an image pickup device configured to capture an image and output the image in a raster scan order; and an image correction circuit including a line buffer into which the image is received in the raster scan order and a processor configured to:

convert a position of an input pixel of an input image received into the input buffer into a first pixel position of an output image using a first conversion function;

convert a position of an output pixel in a vicinity of the first pixel position of the output image into a second pixel position of the input image using a second conversion function;

calculate a pixel value of the second pixel position by interpolation using pixels of the input image that are in a vicinity of the second pixel position of the input image; and output the position of the output pixel as a corrected position of the input pixel and the calculated pixel value as a pixel value at the corrected position, wherein the first conversion function is an n-order polynomial function derived according to correction data that correlates distorted pixel positions with corrected pixel positions and the second conversion function is an m-order polynomial function derived according to the correction data and an inverse function of the first conversion function, and n and m are selected from a set of possible n values and a set of possible m values, wherein the first conversion function is derived using a fixed point operation and the second conversion function is derived using a floating point operation, and the selected n and m generate a smallest amount of inverse function error among all possible combinations of n values and m values, where the inverse function error is equal to a difference between an input pixel position and an output pixel position that is generated using the input pixel position, the first conversion function having the order n, and the second conversion function having the order m.

10. The image processing apparatus according to claim 9, wherein the input pixel position is input into the first conversion function to generate an interim pixel position, and the interim pixel position is input into the second conversion function to generate the output pixel position.

11. The image processing apparatus according to claim 10, wherein n and m are the same.

12. The image processing apparatus according to claim 10, wherein n and m are different.

* * * * *